Oct. 4, 1966 K. R. BURCH 3,276,428
WALL AQUARIUM
Filed Aug. 14, 1964 2 Sheets-Sheet 1

Kenneth R. Burch
INVENTOR.

BY
ATTORNEYS

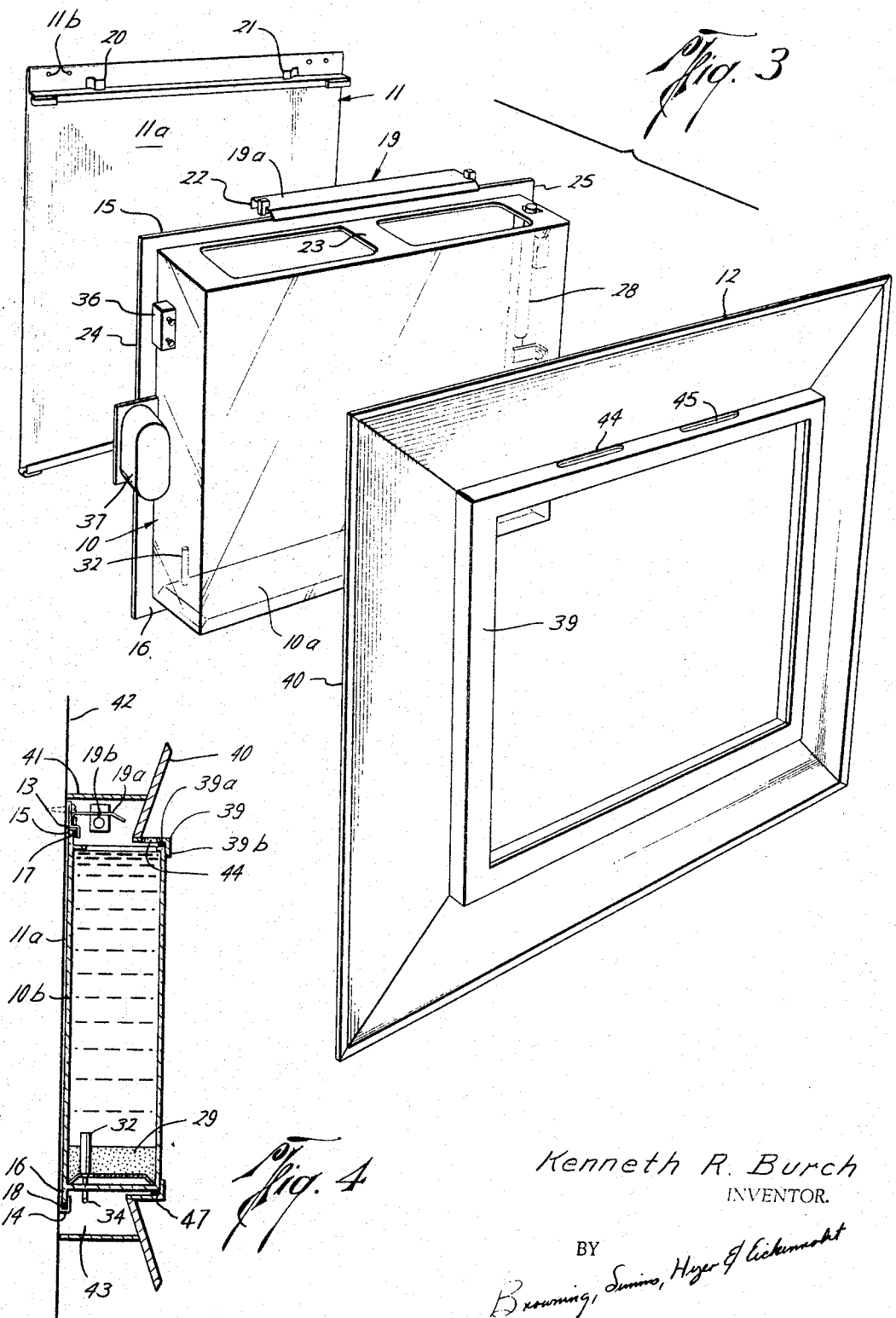

United States Patent Office 3,276,428
Patented Oct. 4, 1966

3,276,428
WALL AQUARIUM
Kenneth R. Burch, 723 Houston First Federal Bldg.,
Houston, Tex.
Filed Aug. 14, 1964, Ser. No. 389,617
13 Claims. (Cl. 119—5)

This invention relates to aquariums, generally. In one of its aspects, it relates to improvements in wall-mounted aquariums, and in another of its aspects it relates to an improved arrangement for aerating the water in an aquarium.

It is desirable, for many reasons, to mount an aquarium on a wall. This locates it above the reach of children, at a more convenient level for observing the fish, and, generally, out of the way of people moving about the room. Therefore, it is an object of this invention to provide an aquarium which can be quickly and easily mounted on a wall.

It is another object of this invention to provide a frame for a wall-mounted aquarium which makes the aquarium look like a picture, which hides from view the auxiliary equipment employed with the aquarium and which can be installed and removed from the aquarium without having to connect or disconnect any auxiliary equipment.

It is also desirable that wall-mounted aquariums be esthetically pleasing and preferably appear as a two dimensional, animated, picture. To obtain this latter effect, the aquarium should be provided with sufficient light to brighten the objects and animals in the aquarium so they can be clearly seen through the water. Usually, the light in a room, particularly at night, is inadequate to illuminate the objects in the aquarium sufficiently to obtain this effect.

To adequately illuminate the objects in the water, the light source should be relatively close to the water. To maintain the illusion of a picture, however, the light source, as well as the other auxiliary equipment normally associated with the aquarium, should be hidden from the direct view of the observer.

Therefore, it is another object of this invention to provide a wall-mounted aquarium having a light source for illuminating the objects in the water which is, along with the auxiliary apparatus associated with the aquarium, completely hidden from view.

It is another object of this invention to provide a wall-mounted illuminated aquarium in which only the light which strikes the water can be seen. It is another object of this invention to provide a wall-mounted illuminated aquarium which, although framed like a picture, allows the aquatic life in the aquarium to be fed, without removing the frame.

It is another object of this invention to provide improved apparatus for aerating the water in the tank and for pumping the water through a filter bed.

These and other objects, advantages and features of the invention will be apparent to those skilled in the art from a consideration of this specification, attached drawings and appended claims.

Figure 1:
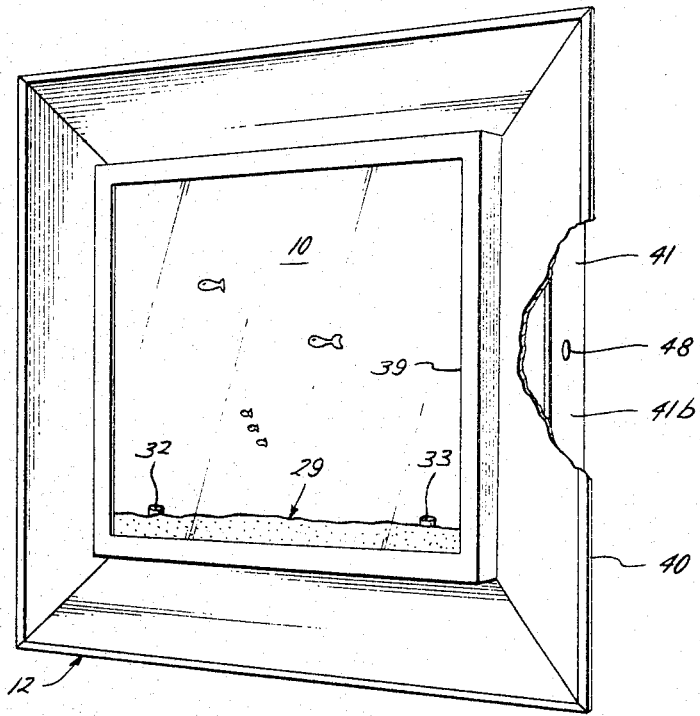
Figure 2:
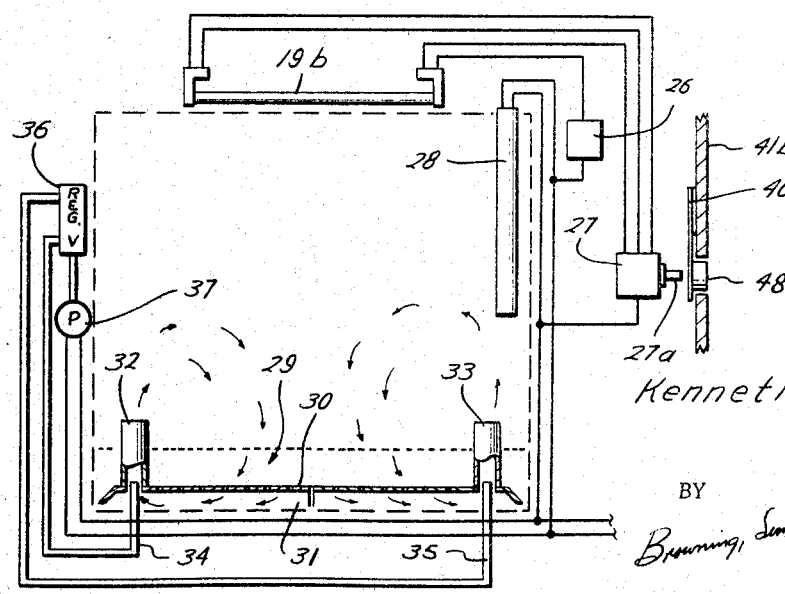

A preferred embodiment of the invention will now be described in connection with the attached drawings, in which FIG. 1 is a perspective view of an embodiment of the wall aquarium of this invention with a portion of the frame broken away to show the location of the switch for turning on and off the light used to illuminate the aquarium;

FIG. 2 is a partial, vertical, section and a partial diagrammatic view showing the aerating equipment of this invention, which improves the circulation of the water through the filter bed in the aquarium, and also illustrating how the frame is arranged to allow the electrical switch to be operated, with the frame in position on the water tank enclosing the switch, without having to mount the switch on the frame thereby allowing the frame to be removed from the tank without having to be disconnected from the switch or the switch from the light;

FIG. 3 is a perspective view of the three major portions of the wall aquarium of FIG. 1, showing the bracket for attaching to the wall to support the water tank, the water tank assembly, including the auxiliary equipment attached thereto, and the frame which encloses all of the water tank which extends away from the wall to prevent any light from being seen except that which strikes the water in the tank, yet which allows the fish and other aquatic animals in the tank to be fed without having to remove the frame; and FIG. 4 is a vertical sectional view of the assembled aquarium of FIGS. 1 and 3 illustrating the arrangement of the members making up the frame whereby the light is confined in the frame except for that which strikes the water, and also illustrating the location of the resilient pads used to cushion the support provided by the bracket for the water tank of the aquarium, and the location of the friction strips between the frame and the water tank which frictionally hold the frame in place on the tank.

As best seen in FIG. 3 the wall mounted aquarium shown in FIG. 1 comprises a water tank 10 and its associated equipment, means for mounting the water tank on a wall, which in this embodiment is bracket 11, and frame 12 which encloses the portion of the water tank extending away from the wall so the contents of the tank can be viewed only from the front side thereof.

Water tank 10 is rectangularly shaped and since this is a wall-mounted aquarium, its length and heighth are preferably, considerably greater than its depth to keep the tank from protruding into the room too far and to enhance the two dimensional illusion which, as will be explained below, is further enhanced by the frame.

The front side 10a of the tank must, of course, be transparent since it is through this side that the objects in the aquarium will be viewed. The rest of the tank can be opaque, however, for ease of manufacture, it is preferable to make the water tank all of the same material, thereby avoiding having to provide watertight joints between dissimilar materials. In the commercial embodiment of this invention, water tank 10 is made from Plexiglas which provides the necessary transparency for viewing the aquatic life in the aquarium, and also the structural strength necessary to support itself when full of water. In addition, Plexiglas is readily drilled and waterproof joints can be obtained very easily between two pieces of Plexiglas by using an appropriate solvent. Other similar materials could be used for the tank, such as Lucite.

Means are provided to mount water tank 10 on a wall to allow it to be easily dismounted, when necessary, for cleaning and repair purposes. In the embodiment illustrated, mounting bracket 11 supports the tank on the wall. The bracket consists of a flat, rectangularly shaped, metal, member 11a which can be attached to a wall in any convenient manner, as by wood screws (not shown) located in holes 11b provided therefor. To support the water tank of the aquarium, member 11 is bent in the manner best seen in FIG. 4 to provide a horizontally extending, downwardly facing, slot 13 adjacent its upper edge, and a horizontally extending, upwardly facing, slot 14 adjacent to its lower edge. These slots are parallel and spaced apart the proper distance to receive therebetween upwardly and downwardly extending flanges 15 and 16 which are integrally attached to rear wall 10b of water tank 10. Thus, slots 13 and 14 provide rails along which flanges 15 and 16 can slide as the tank is removed from and mounted on the bracket. To cushion the mounting of the water tank, resilient means are located between the bottom of slot 14 and flange 16 and between the outer side of slot 13 and flange 15. In the embodiment illustrated, sponge rubber strips 17 and 18 are provided for this purpose.

Mounting bracket 11 also provides a support for light fixture 19, which includes shade 19a and light source 19b. In this embodiment, light 19b is a fluorescent light since it provides an even distribution of light across the top surface of the water tank. Light assembly 19 is removably mounted on wall bracket 11 by means of clips 20 and 21, which engage downwardly extending flange 22 on light reflector 19a. As shown in FIG. 4, the light assembly is located directly above the open end of water tank 10 so its light will be directed downwardly on the water therein.

The top side of tank 10 is not completely open but is provided with two enlarged rectangularly shaped openings instead so that a web 23 is left approximately in the middle of the tank. This provides a bridge between sides 10a and 10b to help support the sides when the tank is full of water. If the material of the tank is of sufficient strength, or in a case where the tank is somewhat smaller than that shown in the drawings, then this strengthening web can be eliminated and the top side of the tank left open completely.

Water tank 10 is also provided with integrally connected, laterally extending, flanges 24 and 25 to provide a mounting surface for the various pieces of auxiliary equipment which are used in connection with the operation of equipment. For example, ballast 26 and electrical switch 27, which are used in conjunction with fluorescent light 19b are mounted on flange 25. This flange can also be used to support a bracket (not shown) for heater 28, which may be used to maintain the temperature of the water in the aquarium at a given level.

Means are also provided to aerate the water and to cause it to circulate through a filter bed of sand generally indicated by the number 29. As is a common practice in aquariums, sand-filter bed 29 is supported above the bottom of the tank by perforated grate 30. This grate is preferably made of a non-corrosive material, such as one of the plastics, and is provided with holes of sufficient size to allow the water to freely flow through the grate into chamber 31 provided therebelow, yet sufficiently small to keep the sand thereabove from falling through the holes.

To aerate the water and cause it to circulate through the sand layer 29 into the lower space 31, air is bubbled up through conduits which connect lower space 31 with the portion of the aquarium above the sand layer. Thus, two conduits, 32 and 33, are attached to sand supporting grate 30 and connect chamber 31 with the water in the aquarium above the sand layer. Extending through the bottom of the tank to a point directly below conduits 32 and 33 are air tubes 34 and 35. These air tubes, in turn, are connected to regulator valve 36 and pump 37, which pumps air through the regulator valve into tubes 34 and 35. The air then flows directly from the air tubes upwardly through open-ended conduits 32 and 33. This movement of the air upward through these conduits, causes the water therein to flow upward along with the air. As the water in the conduits moves upward, it is, of course, replaced by water from chamber 31 which must be replaced, in turn, by water flowing downward through sand layer 29 from the upper portion of the aquarium. In this manner, by pumping air upward through open ended conduits 32 and 33, circulation of the water through the sand layer can be established and maintained.

As explained above, it is one of the objects of this invention to provide an illuminated aquarium where only the light which strikes the water is visible to the viewer of the aquarium. In this embodiment, after mounting bracket 11 is attached to the wall, tank 10 with its associated auxiliary equipment is mounted thereon, and light assembly 19 is in position to illuminate the water from above, frame 12 is positioned around tank 10 to completely enclose all of the tank and associated equipment which extend out from the wall upon which the tank is mounted.

Frame 12 comprises, a frame supporting section 39, which is rectangularly shaped to engage the outer peripheral edge of the top and sides of tank 10 to support the frame. In the embodiment illustrated (FIG. 4), frame supporting section 39 is L-shaped in cross section. One leg, 39a, extends toward the wall, 42, to engage the outer peripheral edge of the tank to support the frame. The other leg, 39b, extends inwardly over the peripheral edge of side 10a to provide the appearance of a picture frame through which the aquarium is viewed. This latter leg, can, of course, be designed to provide an opening of any desired area. For the aquarium to appear as an animated picture, however, the light used to illuminate the aquarium and the auxiliary equipment, mounted along the sides of the tank should not be visible through the transparent walls of the tank. Therefore, these legs should extend downwardly far enough to be well below the level of the water in the tank. In this way, the person observing the aquarium cannot look at the light or the auxiliary equipment mounted along the side of the tank without looking through the water in the tank which prevents him from seeing them due to the refraction of the light in the water.

Preferably the back-side of the tank is covered with an opaque painting (not shown) of a landscape, etc., preferably in color. The picture is, of course, mirrored in the side walls of the tank due to the refraction of the light in the water.

This phenomena, along with the frame which covers the tank, which will be further described below, produces an illusion that the aquarium is of little depth, in fact it appears only slightly thicker than an ordinary picture.

To finish enclosing the aquarium, frame 12 is provided with an escutcheon section 40 and a shroud section 41. Escutcheon 40 is connected to the end of leg 39a of frame supporting section 39 and diverges outwardly therefrom at an angle to the wall. Shroud portion 41, in turn, is attached to escutcheon 40 at some point spaced above the sides of the tank and extends laterally therefrom into engagement with wall 42, as shown in FIG. 4.

In the embodiment illustrated, both the escutcheon and shroud sections extend completely around tank 10. It is not necessary to provide a shroud portion across the lower side of the frame to hide the tank from view in instances where the lower part of the aquarium is well below the level of the viewer, however, to insure that no light escapes from the aquarium except that which strikes the water, it is preferable to provide a shroud portion completely around the tank. This arrangement of the escutcheon and shroud section of the frame provides a continuous compartment 43 which extends completely around the aquarium and in which the auxiliary equipment such as light assembly 19, switch 27, pump 37, etc., can be located.

With frame 12 in position enclosing the aquarium, means are provided to allow the aquatic life in the aquarium to be fed without having to remove the frame therefrom. In the embodiment illustrated, two elongated slots 44 and 45 are located in leg 39a of frame supporting section 39 over the openings in the top side of tank 10. Through these slots food can be dropped into the water of the aquarium, yet to the observer of the aquarium, these slots are not noticeable and in fact, cannot be seen where the top of the tank level is, even with or above the eye level of the observer. Therefore, the slots do not interfere with the illusion of an animated picture. Further, by locating the feeding slots so escutcheon section 40 is between them and light 19b, light can pass out of these openings only by reflection from the surface of the water in the tank. The amount of light thus reflected is extremely small and by locating the slots relatively close to the water, the amount of light reflected upward through them is held to a minimum.

By arranging the escutcheon section 40 and leg 39a of frame supporting section 39 so that substantially all of the escutcheon is between the plane of leg 39b and wall 42, the center of gravity of the frame will be located between the front of the tank and the wall. Thus, there will be no tendency for the frame to fall off the tank once it is located in position thereon. Since the center of gravity is inboard of the tank, however, the bottom of the frame will tend to rock outwardly away from the lower edge of the tank and to prevent this, strips of abrasive or friction material, such as adhesive tape, are located between leg 39a of the frame supporting section and the tank to provide abrasive surface 47 to increase the friction between these two members sufficiently to hold the frame in position on the tank.

As explained above, to allow the frame to be removed without having to disconnect an electrical connection, and also to allow the electric switch 27 which controls the light to be manipulated without having to remove the frame, means are provided on the frame which are not connected to the switch but which allow the switch to be operated. Thus, as shown in FIG. 2, electric switch 27 is mounted on flange 25 of the tank with its actuating button 27a adjacent to the side 41b of shroud portion 41. The switch is of the push-push type so push button 27a will be in the same position whether the switch is open or closed. A hole is provided in shroud section 41b directly opposite switch button 27a and plug member 48 is positioned therein. The plug member is resiliently held in the opening by leaf spring 46 which has one end attached to the plug and one end attached to the shroud. This allows plug 48 to be pushed inwardly until it engages and actuates button 27a of switch 27 after which spring 46 will return the plug back to its position substantially filling the opening in the shroud. By using a plug of the same color or material as that from which the frame shroud is manufactured, this switch actuating mechanism will be hardly noticeable to the casual observer, and further, it allows the frame to be moved and reinstalled on the tank without having to be disconnected from a switch.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a wall mounted aquarium including a water tank of transparent material and means for supporting the tank on the wall, the improvement, in combination therewith of a frame of opaque material removably supported by the tank for enclosing the front side, top, bottom, and ends of the tank, said frame having an opening therein adjacent the front side of the tank and below the level the tank will be filed with water, through which the contents of the tank can be observed, said frame being further provided with an opening above the top of the tank through which material can be introduced into the tank without removing the frame therefrom.

2. A wall mounted aquarium, comprising, water tank of clear material; means for mounting the tank on a wall; a frame of opaque material removably mounted on the water tank for enclosing the portion of the tank extending away from the mounting means, said frame having an opening, below the level the tank is to be filled with water, through which objects in the water can be observed; said frame being further provided with a frame supporting section, extending across the top of the tank adjacent its outer edge, with a portion of the section being in engagement with and supported by the tank, a shroud section spaced from and extending across the top of the tank, and an escutcheon section connecting the frame supporting section to the shroud section, the shroud section and the escutcheon combining with the wall to provide an enclosed compartment, and a light source mounted above the tank in the compartment to illuminate water in the tank.

3. The aquarium of claim 2 in which the light source is powered by electricity and means are provided for supplying the light source with electricity including switch means comprising a push button switch located between the tank and the frame with the switch operating button adjacent the frame, the frame having an opening adjacent the switch with a plug of material reciprocally mounted therein for movement into and out of switch actuating position and means for limiting the movement of the plug through the opening away from the switch.

4. A wall-mounted aquarium comprising, an open-ended, rectangular, water tank of clear material, means for supporting the tank with one side adjacent a wall, a frame of opaque material removably mounted on the tank for enclosing all but a portion of the side of the tank away from the wall, said frame including a rectangular frame supporting section for engaging the outer peripheral edges of the top and sides of the tank to support the frame on the tank; an escutcheon section attached to the supporting section and extending outwardly from the tank, and a shroud section attached to the escutcheon section and extending from the escutcheon section to the wall, said frame supporting section being further provided with an abrasive surface to engage the tank when the frame is mounted on the tank to frictionally hold the frame in position.

5. The aquarium of claim 4 in which the escutcheon section diverges outwardly from the wall and is attached to the frame supporting section between the wall and the outer edge of the tank a sufficient distance from the outer edge of the tank to maintain substantially all of the escutcheon between the wall and the plane of the front of the tank.

6. A wall mounted aquarium, comprising, water tank of clear material; means for mounting the tank on a wall; a frame of opaque material removably mounted on the water tank for enclosing the portion of the tank extending away from the mounting means, said frame having an opening, below the level the tank is to be filled with water, through which objects in the water can be observed; said frame being further provided with a frame supporting section, extending across the top of the tank adjacent its outer edge, with a portion of the section being in engagement with and supported by the tank, a shroud section spaced from and extending across the top of the tank, and an escutcheon section connecting the frame supporting section to the shroud section, the shroud section and the escutcheon combining with the wall to provide an enclosed compartment; a light source mounted above the tank in the compartment to illuminate water in the tank; and said frame supporting section having an opening located above the open end of the tank located between the escutcheon section and the light source to allow material to be introduced into the tank without removing the frame while allowing only that portion of the light from the light source which reflects through the slot from the surface of the water to pass therethrough.

7. An aquarium adapted to be mounted on a wall comprising a rectangular shaped water tank of clear material having upwardly and downwardly extending flanges attached thereto in the plane of one of the tank walls; a bracket for mounting the tank on a wall, said bracket having a downwardly facing, horizontally extending, slot adjacent its upper edge and an upwardly facing, horizontally extending, slot adjacent its lower edge to receive the upwardly and downwardly extending flanges of the tank, respectively, and support the tank.

8. The aquarium of claim 7 in which the water tank is made of a clear plastic material having the flanges formed integrally with the tank.

9. The aquarium of claim 8 in which the material is Plexiglas.

10. The aquarium of claim 7, further provided with a strip of resilient material between the bottom of the slot adjacent the lower edge of the bracket and the downwardly extending flange and a strip of resilient material between the upwardly extending flange and the side of the slot away from the wall to resiliently support the tank on the bracket.

11. An aquarium comprising, in combination, a water tank, and means for aerating water in the tank including an open-ended upwardly directed air conduit extending through the bottom of the tank into the water below its surface with its open end constituting a means located to allow air to flow from the conduit to the surface of the water without reversing the direction it is flowing when it leaves the conduit, and a second conduit of larger diameter with its longitudinal axis generally parallel to the direction of travel of the air when it travels from the air conduit to the surface and constituting a means on the bottom located to allow the air leaving the air conduit to travel through the second conduit as it travels toward the surface to thereby cause water in the bottom of the tank to also flow through the second conduit toward the surface of the water.

12. The aquarium of claim 11 in which the tank is provided with a layer of sand and the second conduit is located to extend through the sand layer whereby the water which is carried toward the surface through the second conduit, by the air from the air conduit, reaches the second conduit by traveling downwardly through the sand.

13. An aquarium comprising, a water tank having a layer of sand adjacent its bottom, perforated means for supporting the sand above the bottom to provide a space between the sand and the bottom, an open-ended conduit attached to the sand supporting means and extending through the sand toward the surface of the water, and an air conduit extending through the bottom of the tank and located adjacent the lower end of the open-ended conduit to cause a stream of air to flow from the air conduit upwardly through the open-ended conduit toward the surface of the water to thereby aerate the water and to cause the water in the tank to flow downwardly through the sand and the perforated supporting means into the open space therebelow and upwardly through the open-ended conduit.

References Cited by the Examiner

UNITED STATES PATENTS

| | | | |
|---|---|---|---|
| 475,404 | 5/1892 | Lochmann | 119—5 |
| 1,777,944 | 10/1930 | Trovato | 119—5 X |
| 2,002,380 | 5/1935 | Wernick et al. | 119—5 X |
| 2,144,551 | 1/1939 | Skolnick | 119—5 |
| 2,293,612 | 8/1942 | Montague | 119—5 |
| 2,871,820 | 2/1959 | Hayden | 119—5 |
| 3,113,555 | 12/1963 | Overman | 119—5 |

SAMUEL KOREN, *Primary Examiner.*

ALDRICH F. MEDBERY, *Examiner.*